United States Patent [19]
Hammond

[11] Patent Number: 5,859,658
[45] Date of Patent: Jan. 12, 1999

[54] LED PRINTBAR AGING COMPENSATION USING I-V SLOPE CHARACTERISTICS

[75] Inventor: Thomas J. Hammond, Penfield, N.Y.

[73] Assignee: Xerox Corporation, Stamford, Conn.

[21] Appl. No.: 545,477

[22] Filed: Oct. 19, 1995

[51] Int. Cl.⁶ .................... B41J 2/45; B41J 2/47; B41J 2/435
[52] U.S. Cl. ............................ 347/238; 347/237
[58] Field of Search .................... 347/236, 237, 347/238, 246, 241

[56] References Cited

U.S. PATENT DOCUMENTS

| | | | |
|---|---|---|---|
| 4,525,729 | 6/1985 | Agulnek et al. | 347/237 |
| 4,689,694 | 8/1987 | Yoshida | 347/237 |
| 4,706,130 | 11/1987 | Yamakawa | 347/130 |
| 4,780,731 | 10/1988 | Creutzmann et al. | 346/108 |
| 4,831,395 | 5/1989 | Pham et al. | 347/237 |
| 4,897,672 | 1/1990 | Horiuchi et al. | 347/236 |
| 4,952,949 | 8/1990 | Uebbing | 347/237 |
| 5,016,027 | 5/1991 | Uebbing | 346/107 R |
| 5,025,322 | 6/1991 | Ng | 347/237 |
| 5,138,337 | 8/1992 | Ng | 347/237 |
| 5,623,300 | 4/1997 | Itoh et al. | 347/237 |

*Primary Examiner*—N. Le
*Assistant Examiner*—Thinh Nguyen
*Attorney, Agent, or Firm*—John M. Kelly

[57] ABSTRACT

An apparatus for compensating LED printbars, and printers which use LED printbars, for aging. Changes in the slopes of the forward voltage drop verses forward current characteristics (the I-V characteristics) of the LEDs of the LED printbar are determined. The drive currents of the LEDs are then changed as a function of the changes in the slopes so as to compensate for changes in the LED light outputs.

4 Claims, 3 Drawing Sheets

LED PRINTBAR AGING COMPENSATION USING I-V SLOPE CHARACTERISTICS

FIELD OF THE INVENTION

The present invention relates generally to LED printbars and to printers which use such printbars. More particularly, the present invention relates to techniques for maintaining LED printbar uniformity and/or printer exposure uniformity over time.

BACKGROUND OF THE INVENTION

The use of printbars comprised of discrete, light-emitting sources in image recording systems is well known. One commonly used printbar is the LED printbar. LED printbars used in imaging systems are typically comprised of a large number of closely spaced light emitting diodes (LEDs), an array of selfoc (self-focusing) lens, an LED current driver for each LED, and control electronics (which may include a shift register). The control electronics receives image signals from an external device and routes signals to the LED current drivers so as to cause the LEDs selected by the image signals to radiate light. The selfoc lenses focus radiated light onto a photoreceptor. By providing relative motion between the LED printbar and a photoreceptor, and by applying image signals at the proper times, a desired latent electrostatic image can be produced on the photoreceptor. Each area of the photoreceptor which can be illuminated by an LED is referred to as a pixel; the sum of all pixels comprise the latent image.

The LEDs of most LED printbars are arranged in a linear array of one or more rows. By making the length of a row as long as the image that is to be formed an LED printbar can produce a desired image line by line. Since it is difficult to produce a row of closely spaced LEDs with the required length (say 8 to 14 inches) LED chips of smaller lengths are usually butted together and interconnected to act as a single row. If more than one row is used, the various rows are usually offset in a staggard fashion.

While imaging systems which use other modulation schemes are possible, the most common way of modulating the LEDs is to turn them either fully ON or fully OFF in accordance with image signals applied to the printbar. The image signals may be from any of a number of sources, such as a raster input scanner (RIS), a computer, a facsimile machine, or a word processor. U.S. Pat. Nos. 4,689,694, issued on 25 Aug. 1987 to Yoshida; 4,706,130, issued on 10 Nov. 1987 to Yamakawa; and 5,138,337, issued on 11 Aug. 1992 to Ng are representative of prior art printhead control circuitry. Prior art exposure control systems are disclosed in U.S. Pat. No. 4,525,729, issued on 25 Jun. 1985 to Agulnek et al., and in U.S. Pat. No. 5,025,322, issued on 18 Jun. 1991 to Ng. Those prior art references are hereby incorporated by reference.

To create high quality images with an LED printbar, each of the LEDs should have the same light output when ON. To meet current image quality goals the LED light output uniformity must be within 1 or 2%. One known way of achieving such uniformity this to create and store a correction matrix of light output values, one value for each LED, during a calibration phase. The stored correction values can then be downloaded to correction circuitry each time the printer is turned on. The correction circuitry can then compensate for light output differences by controlling an electrical signal, usually the drive current, to the individual LEDs based upon the stored correction values.

While the above scheme of achieving light output uniformity is generally successful, the individual LEDs of an LED printbar may have different aging characteristics which can eventually result in unacceptable pixel-to-pixel exposure uniformity. One solution to this aging problem is to periodically scan the LED printbar with a photosensor as each LED is individually turned on. The light output from each LED is then measured and, if necessary, the stored correction value for the particular LED is updated to reflect changes in light output. While this system compensates for aging, it is rather expensive and uses valuable space near the photoreceptor. Other solutions to the aging problem are described in U.S. Pat. Nos. 5,016,027, issued on 14 May 1991 to Uebbing and 4,982,203, issued on 1 Jan. 1991 to Uebbing et al., and in co-pending U.S. patent application Ser. No. 08/514,033 entitled, "AUTOMATIC LED PRINTBAR UNIFORMITY ADJUSTMENT" which was filed on 11 Aug. 1995. However, those methods may not be optimal. Therefore, a new method of maintaining light output uniformity in an LED printbar, and thus pixel-to-pixel exposure uniformity over time, would be useful.

SUMMARY OF THE INVENTION

The present invention can be used to compensate LED printbars for aging and can be used to achieve long term exposure uniformity in printers which use LED printbars. According to the principles of the present invention a method of compensating an LED printbar includes the steps of determining a change with diode use in the slope of the forward voltage drop verses the forward current characteristic (referred to herein as the I-V characteristic) of at least one LED of the printbar, and then changing that LED's drive current based upon the determined change in slope and the relationship between the I-V slope change and the diode efficiency such that LED emits substantially the same as the other LEDs of the LED printbar.

The principles of the present invention also provide for a method of achieving long term exposure uniformity in a printer which uses an LED printbar to expose a photoconductor. That method is comprised of the steps of initially calibrating the LEDs of the LED printbar such that each LED emits substantially the same light intensity when turned ON, determining the change in the slope of the I-V characteristic with LED use of at least one LED of the printbar, and then changing the drive current of that at least one LED based upon that LED's change in slope such that LED emits substantially the same as the other LEDs of the LED printbar.

The principles of the present invention also provide for an LED printbar which is compensated for aging. That printbar is comprised of a plurality of individual LEDs and a plurality of current drivers, each having a control input, wherein each current driver drives an associated LED such that the associated LED outputs a light intensity that is dependent upon a correction value applied to that LED's associated current driver's control input. The printbar further includes a memory network for storing both a correction value for each current driver and an initial slope value for each LED, wherein each initial slope value represents a slope of the forward voltage drop verses forward current characteristic (I-V characteristic) of that LED at a first time. The memory network is further for applying a stored correction value to each of said control inputs, wherein the stored correction values cause each of the LEDs to output substantially the same light intensity. The printbar further comprises a slope determining network for determining the slope of the I-V characteristic of each LED subsequent to the first time, and a correction value algorithm network for updating the correction values stored in the memory network as a function of the initial slope value and the subsequently determined slope value of each LED.

The principles of the present invention also provide for exposure compensation in a printer which uses an LED printbar for exposing a photoconductor. That printer is comprised of a photoconductor that is exposed by an LED printbar which is comprised of a plurality of individual LEDs and a plurality of current drivers, each having a control input, wherein each current driver drives an associated LED such that the associated LED exposes the photoconductor with a light intensity that is dependent upon a correction value applied to that LED's current driver's control input. The printer further includes a memory network for storing both a correction value for each current driver and an initial I-V slope value for each LED, wherein each initial slope value represents a slope of the forward voltage drop verses forward current characteristic (I-V characteristic) of that LED at a first time. The printer's memory network is further for applying a stored correction value to each of said control inputs, wherein the stored correction values cause each of the LEDs to output substantially the same light intensity. The printer further comprises a slope determining network for determining the slope of the I-V characteristic of each LED subsequent to the first time, and a correction value algorithm network for updating the correction values stored in the memory network as a function of the initial slope value and the subsequently determined slope value of each LED.

BRIEF DESCRIPTION OF THE DRAWINGS

Other aspects of the present invention will become apparent as the following description proceeds and upon reference to the drawings, in which.

DESCRIPTION OF THE INVENTION

The present invention enables both for long term light output uniformity from LED printbars and for long term exposure uniformity in printers which use LED printbars. While the following describes a printing machine 8 (see FIG. 1) which incorporates the principles of the present invention, it is to be understood that the present invention is not limited to the described embodiment.

Figure 1:
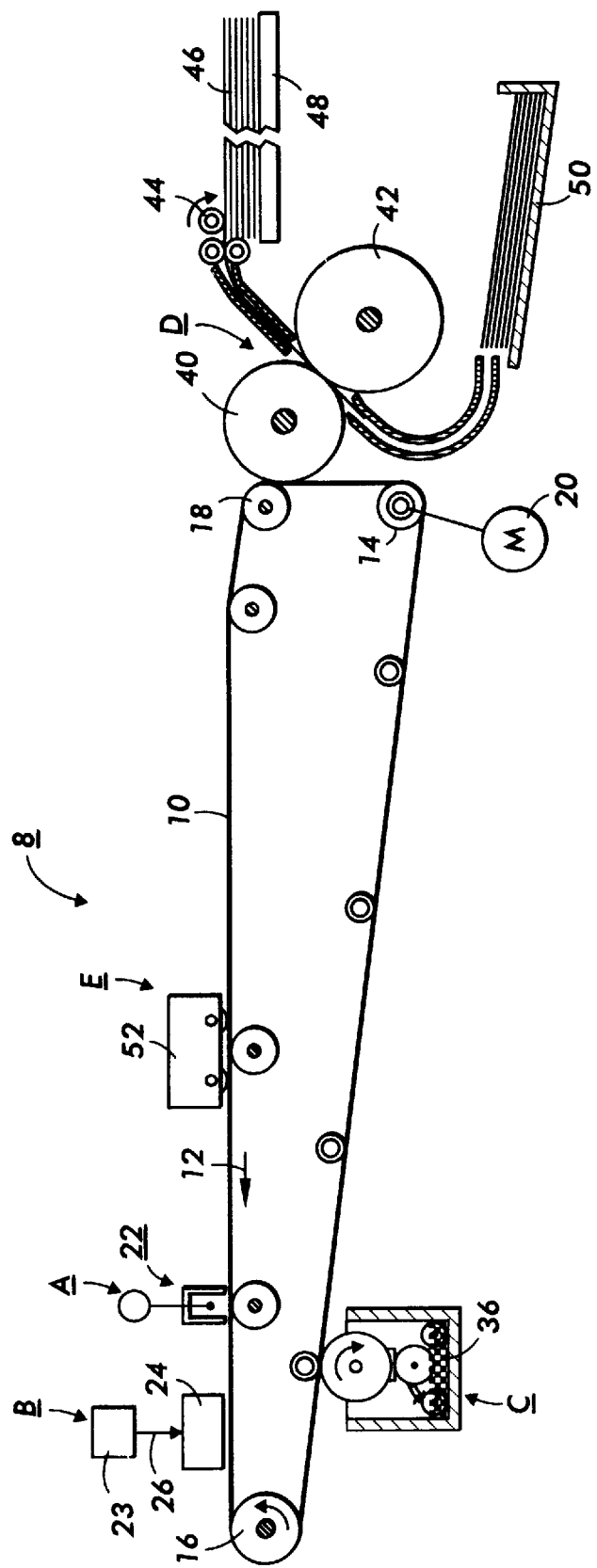
FIG. 1 schematically depicts an example of a printing machine which is suitable for use with the present invention.

Turning now to FIG. 1, the printing machine 8 includes a charge retentive surface in the form of an Active Matrix (AMAT) photoreceptor 10 which has a photoconductive surface and which travels in the direction indicated by the arrow 12. Photoreceptor travel is brought about by mounting the photoreceptor about a drive roller 14 and two tension rollers, the rollers 16 and 18, and then rotating the drive roller 14 via a drive motor 20.

As the photoreceptor moves each part of it passes through each of the subsequently described process stations. For convenience, a single section of the photoreceptor, referred to as the image area, is identified. The image area is that part of the photoreceptor which is operated on by the various process stations to produce a developed image. While the photoreceptor may have numerous image areas, since each image area is processed in the same way a description of the processing of one image area suffices to explain the operation of the printing machine.

As the photoreceptor 10 moves, the image area passes through a charging station A. At charging station A a corona generating corotron 22 charges the image area to a relatively high and substantially uniform potential, for example about −500 volts. While the image area is described as being negatively charged, it could be positively charged if the charge levels and polarities of the other relevant sections of the printer are appropriately changed. It is to be understood that power supplies are input to the corotron 22 and to the other elements as required for the elements to perform their intended function.

Figure 2:
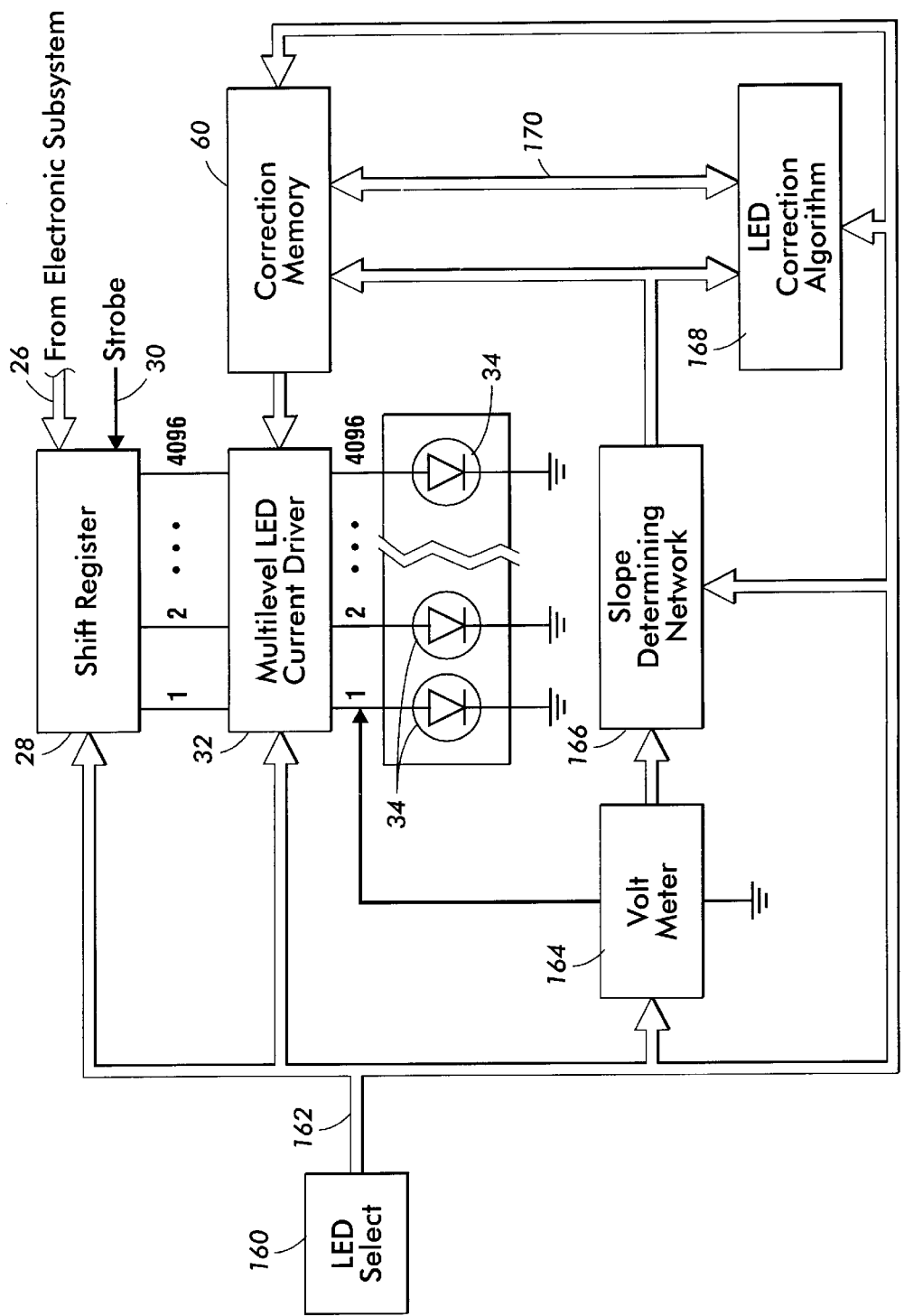
FIG. 2 is a schematic depiction of an LED printbar which is suitable for practicing the present invention.

After passing through the charging station A the now charged image area passes through an exposure station B. Exposure station B includes an electronic subsystem 23 which outputs image signals, those signals being digital representations of lines of an image that is to be produced, to an LED printbar 24 via a bus 26. Turning now to FIG. 2, the LED printbar 24 includes a digital network, depicted in FIG. 2 as a shift register 28, which receives the image signal on the bus 26. It is to be understood that the particular digital network to be used in a given application will depend upon the design architecture of the imaging system. However, the simple shift register 28 suffices to fully explain the present invention while avoiding needless complexity. When the image signal has been shifted into the shift register a strobe signal (which is also from the electronic subsystem 23) applied to a line 30 of the bus 26 signals that an image line is to be printed. The strobe signal synchronizes the operation of the LED printbar with the relative motion of the image area.

When the strobe signal occurs the shift register applies its signals to an array of multilevel LED current drivers 32. Based upon the signals from the shift register the multilevel LED current drivers, one for each LED 34, cause their associated individual LEDs to be selectively energized. For example, if a signal from the shift register is HIGH, the multilevel LED current driver associated with that shift register signal may cause its associated LED to be turned on. By shifting decoded image signal representations of an image to be produced line by line into the shift register, and by synchronizing LED printbar light outputs with the strobe signal, a desired latent image is produced on the image area. The operation of the other circuitry shown in FIG. 2 is described subsequently.

Referring back to FIG. 1, after passing through the exposure station B the now exposed image area passes through a development station C. At the development station C negatively charged development material 36, which is comprised of black toner particles, is advanced onto the image area. The development material is attracted to the less negative sections of the image area and repelled by the more negative sections. The result is a toner image on the image area.

After passing through the development station C the image area advances to a transfusing station D. The transfusing station includes a positively charged, rotating transfusing member 40 which forms a nip with a heated, rotating backup roller 42. The transfusing station further includes a sheet feeder 44 which moves a sheet 46 from a sheet holder 48 through the nip to a catch tray 50. When the image area passes through the transfusing station D the positive charge on the transfusing member 40 attracts the negatively charged toner particles from the more negatively charged photoreceptor belt. Synchronized with the motion of the transfusing member, the sheet feeder 44 moves a sheet from the sheet holder through the nip. The nip forms a fusing zone wherein heat and pressure fuses toner particles to the sheet 46.

After the toner image is transferred to the transfusing member 40 the image area passes to a cleaning station E. The cleaning station E removes any residual development material from the photoreceptor 10 using a cleaning brush contained in a housing 52. The image area then advances back to the charging station A for the start of another cycle.

The reader's attention is now directed once again to FIG. 2. As previously discussed the multilevel LED current drivers 32 cause the individual LEDs 34 of the LED printbar 24 to turn ON and OFF in response to signals from the shift register 28. Also as previously discussed, to create high quality images using an LED printbar each of the printbar's LEDs should have the substantially the same light output when ON (light output uniformity within 1 or 2% is desirable). Since the light output verses forward current characteristic of individual LEDs may vary considerably, each of the multilevel current drivers 32 of the LED printbar includes input terminals for receiving correction values stored in a correction memory 60. The multilevel current drivers are designed such that the currents applied to the associated LEDs are dependent upon the correction value applied to the individual multilevel current drivers. The correction values are initially determined during a calibration of the LED printbar by applying a known current to each LED individually. Then, that LED's drive current is adjusted, by changing the correction value applied to that LED's multilevel current driver until a predetermined light intensity output is measured. The correction value for that LED is then stored in the correction memory 60. After calibration, when the printing machine 8 is turned on the stored correction values are downloaded from the correction memory 60 to the various multilevel current drivers 32.

While a correction memory that holds correction values is beneficial, as the LED printbar ages the correction value determined during initial calibration becomes increasingly inaccurate. Therefore, according to the principles of the present invention after the occurrence of a predetermined event, such as after a predetermined number of strobe signals, after a predetermined number of pages have been printed, after a predetermined number of times the printer has been turned on, after an operator signals that correction is required the correction values are updated using changes in the forward current-forward voltage (I-V) slopes of the individual LEDs.

Since the present invention uses changes in the I-V slopes over time, the I-V slope of each LED is beneficially determined during initial calibration and stored in memory for later use. Beneficially the slopes determined during initial calibration are stored in the correction memory 60 (which may be implemented as one memory device or as a combination of memory devices). After the occurrence of the predetermined event the I-V slope is determined again. Using an algorithm which relates changes in the I-V slope to light efficiency loss, a new correction value for each LED 34 is calculated and stored in the correction memory 60. Alternatively, only those LEDs with a change is I-V slope greater than a predetermined value will have their correction value updated. Beneficially, this process repeats as the LED printbar ages.

Figure 3:
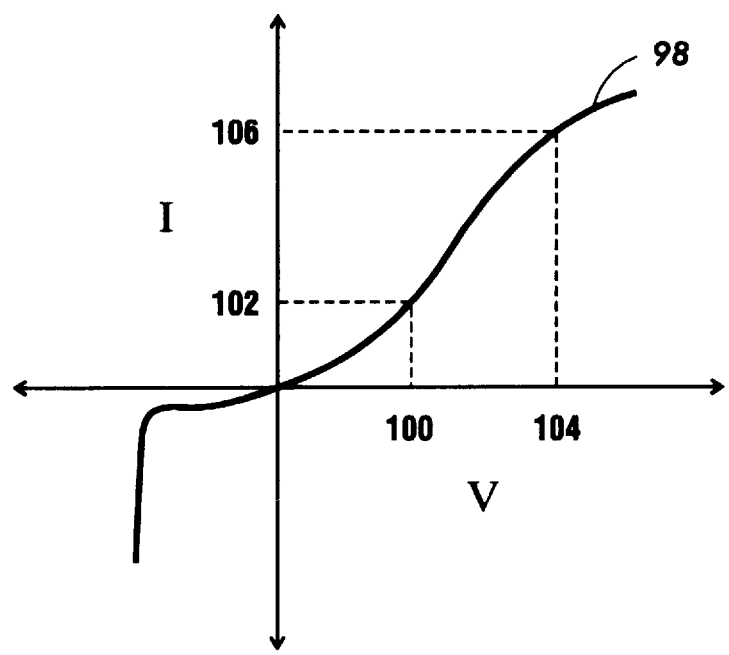
FIG. 3 is a graph of the I-V characteristics of a typical LED.

Turn now to FIG. 3 for a graph of an exemplary I-V characteristic of an LED. Voltage (V) is plotted along the X axis, current (I) is plotted along the Y axis, and the relationship between I and V for the LED is plotted as a curve 98. With a forward voltage of a value 100 the LED conducts a current of a value 102; with a forward voltage of a value 104 (which is greater than the value 100) the LED conducts a current of a value 106 (which is greater than the value 102). The I-V curve 98 can be described algebraically using the diode equation:

$$I=I_0\{\exp(eV/nKT)-1\}$$

Where I is the current, Io is the diode saturation current (which depends upon the diode), e is the electron charge, V is the junction voltage, T is the temperature (in degrees Kelvin), K is Boltzmann's constant, and n is a parameter which relates the recombination rates of the LED. The parameter n is equal to 1 for normal radiative recombination, equal to 2 for non-radiative recombination, and between 1 and 2 for an LED with both radiative and non-radiative recombination. While n will vary from LED to LED, it will be between 1 and 2 and will (usually) increase as the LED ages. As is obvious from FIG. 3 and from the diode equation, the slope of the curve 98 is not constant; it depends upon the point where the slope is to be found. However, let the slope be approximated by:

$$\text{Slope}=(I_{106}-I_{102})\div(V_{104}-V_{100})$$

According to the principles of the present invention a change in the slope of an LED can be equated to a change in light radiation from that LED. That change in light radiation is compensated for by changing the correction value of that LED as a function of the change in slope.

AS previously discussed, one way of determining changes in the slope of an LED's I-V characteristic is to first determine that LED's slope during an initial calibration, storing that slope for later use, finding the slope at a subsequent time, and then comparing the initial slope and the later slope values. Turn now to FIG. 2 to assist in understanding how the LED printbar 24 determines changes in the slopes of the individual LEDs 34.

During initial calibration, an LED Select circuit 160 applies LED calibration data on a data bus 162 to the shift register 28, the multilevel current driver 32, the correction memory 60, and to a voltmeter 164, a slope determining network 166, and an LED correction algorithm circuit 168. Based upon the LED calibration data the shift register 28 selects one of the LEDs 34, say the LED labeled 1 in FIG. 2, for calibration; the other LEDs are turned off. Depending upon the LED calibration data the multilevel current driver 32 outputs either a fixed current of a magnitude $I_A$ (which corresponds to current 102 in FIG. 3) or a fixed current of a magnitude $I_B$ (which corresponds to current 106 in FIG. 3). The current $I_A$ causes LED 1 to have a forward voltage of $V_A$ (which corresponds to the voltage 100 in FIG. 3); the current $I_B$ causes LED 1 to have a forward voltage of $V_B$ (which corresponds to the voltage 104 in FIG. 3).

The LED calibration data on bus 162 directs the voltmeter 164 to determine the forward voltage of the LED selected by the shift register 28 (assumed to be LED 1). When current $I_A$ is applied to the selected LED the voltage reading $V_A$ is output from the voltmeter 164 to the slope determining network 166. The reading of $V_A$ is temporarily stored in the slope determining network. After a period of time sufficient for the slope determining network to have stored the reading of $V_A$ (or in response to the slope determining network signaling that it has stored $V_A$), the LED select circuit 160 signals the multilevel current driver 32 to apply current $I_B$ to the selected LED. The voltmeter 164 then reads $V_B$ and applies that reading to the slope determining network 166.

With readings of both $V_A$ and $V_B$ available, and with predetermined knowledge of $I_A$ and $I_B$, the slope determining network determines the slope of the I-V characteristic of the selected LED (again, assumed to be LED 1). The slope determination is be performed using the formula:

$$\text{Slope}=(I_B-I_A)\div(V_B-V_A)$$

During initial calibration, the determined slope is stored (as a correction value) for later use in the correction memory 60 at a location selected by the LED calibration data. The LED select circuit 160 then applies signals which causes the above initial slope determination sequence to repeat for LED 2. The process keeps repeating until initial slope values for each LED 34 is stored in the correction memory.

While slope determination is readily performed, one notable problem exists. When determining $V_A$ and $V_B$ it is beneficial to minimize the LED's diode junction temperature rise. One way of doing so is to apply $I_A$ and $I_B$ to the selected diode only for a very short period of time. A total $V_A$–$V_B$ measurement time of about 10 μsec is beneficial.

After the occurrence of the predetermined event the correction values in the correction memory are updated. To do so the slope of each LED 34 is found in the same manner, using the same currents $I_A$ and $I_B$, as previously described. Briefly, the shift register 28 selects the individual LEDs for slope determination, that LED's associated multilevel current driver sequentially applies the currents $I_A$ and $I_B$ to the selected LED 34, the voltmeter 164 determines the voltages $V_A$ and $V_B$ and outputs those measurements to the slope determining network 166. The slope determining network then determines the slope according to the formula given above.

However, after determining the slope the slope determination network does not send the newly determined slope to the correction memory 60 (as was done during initial calibration). Rather, the newly determined slope is applied to the LED Correction Algorithm circuit 168. Additionally, the initial calibration slope of the selected LED, which is stored in the correction memory 60, is applied to the LED Correction Algorithm circuit via a bi-directional bus 170. The LED Correction Algorithm circuit determines the change in the slope of the selected LEDs and computes a new correction value from the determined slope difference using a suitable formula. That new correction value is then applied to the correction memory via the bi-directional bus 170. The correction memory overwrites the original correction value with the new correction value. The updating process repeats for each of the LEDs 34.

The particular algorithm to be used by the LED Correction Algorithm circuit 168 to determine the new correction values will depend upon the LED printbar characteristics. One general approach, beneficial in some applications, is to increase the selected LED's drive current (by adjusting the LED's correction value) by a constant K times the change in slope. This approach has the benefit of simplicity. Another approach is to determine a formula which relates LED light output to the value of n (possibly taking the diode saturation current Io into consideration), or alternatively, determining a formula which relates changes in n to changes in LED light output.

While the embodiment disclosed herein is preferred, it will be appreciated that various modifications, variations or improvements may be made without deviating from the principles of the present invention. For example, the embodiment described above applies fixed currents $I_A$ and $I_B$ to a selected LED and measures voltages $V_A$ and $V_B$ at those currents. Another way of determining the I-V slope is to apply fixed voltages $V_A$ and $V_B$ to the selected LED and then measure $I_A$ and $I_B$. Therefore, the present invention is intended to include everything encompassed by the following claims.

What is claimed is:

1. An LED printbar comprising:
   a plurality of individual LEDs;
   a first current driver having a control input, said first current driver for applying a first drive current to a first LED of said plurality of individual LEDs, wherein said first drive current is controlled by said first control input;
   a second current driver for applying a second drive current to a second LED of said plurality of individual LEDs such that said second LED emits light with a resulting intensity;
   a correction memory for storing a correction value and an initial slope value, said correction memory for applying said correction value to said control input;
   a slope determining network for determining a subsequent slope of the forward voltage drop verses forward current characteristic of said first LED; and
   a correction algorithm network operatively connected to said slope determining network and to said correction memory, said correction algorithm network for updating said correction value stored in said memory network as a function of a difference between the initial slope value and the subsequent slope value;
   wherein said updated correction value causes said first LED to emit light at an intensity substantially equal to the intensity of the light emitted from said second LED.

2. The LED printbar according to claim 1, wherein said initial slope value represents a slope of the forward voltage drop verses forward current characteristic of said first LED at a first time, and wherein said subsequent slope value represents a slope of the forward voltage drop verses forward current characteristic of said first LED at a second time which is subsequent to said first time.

3. A printer, comprising:
   a photoconductor;
   a plurality of individual LEDs adjacent said photoconductor, said individual LEDs for illuminating said photoconductor;
   a first current driver having a control input, said first current driver for applying a first drive current to a first LED of said plurality of individual LEDs, wherein said first drive current is controlled by said first control input;
   a second current driver for applying a second drive current to a second LED of said plurality of individual LEDs such that said second LED emits light with a resulting intensity;
   a correction memory for storing a correction value and an initial slope value, said correction memory for applying said correction value to said control input;
   a slope determining network for determining a subsequent slope of the forward voltage drop verses forward current characteristic of said first LED; and
   a correction algorithm network operatively connected to said slope determining network and to said correction memory, said correction algorithm network for updating said correction value stored in said memory network as a function of a difference between the initial slope value and the subsequent slope value;
   wherein said updated correction value causes said first LED to emit light at an intensity substantially equal to the intensity of the light emitted from said second LED.

4. The LED printbar according to claim 3, wherein said initial slope value represents a slope of the forward voltage drop verses forward current characteristic of said first LED at a first time, and wherein said subsequent slope value represents a slope of the forward voltage drop verses forward current characteristic of said first LED at a second time which is subsequent to said first time.

* * * * *